Nov. 4, 1924.
S. GARRICK
AUTOMOBILE SAFETY TIRE
Filed Jan. 23, 1924
1,514,315
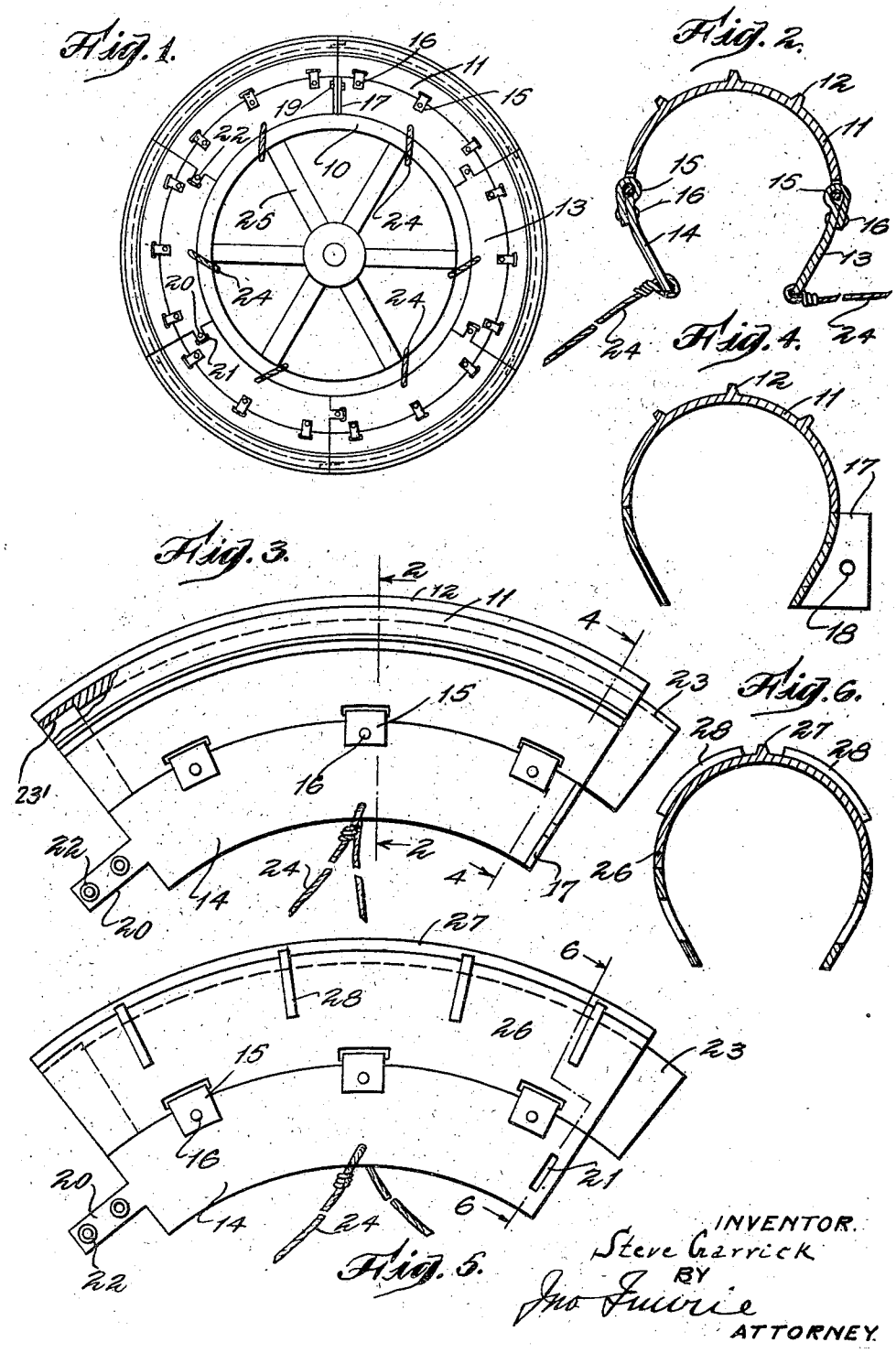

Patented Nov. 4, 1924.

1,514,315

UNITED STATES PATENT OFFICE.

STEVE GARRICK, OF DETROIT, MICHIGAN.

AUTOMOBILE SAFETY TIRE.

Application filed January 23, 1924. Serial No. 688,082.

*To all whom it may concern:*

Be it known that I, STEVE GARRICK, a subject of the King of England, residing at Detroit, in the county of Wayne and State of Michigan, have invented certain new and useful Improvements in Automobile Safety Tires, of which the following is a specification.

This invention relates to improvements in anti-skidding devices for wheel tires, etc., and it is the principal object of my invention to provide a device of this character which can quickly be attached to and removed from a wheel.

Another object of the invention is the provision of an anti-skidding device of simple and inexpensive construction adapted to be secured to the front and rear wheels of a car.

A further object of the invention is the provision of an anti-skidding device which is made in a plurality of sections so that it may conveniently be stored when not in use.

A still further object of my invention is the provision of a sectional anti-skidding device which is provided with novel and efficient means for connecting and securing the single sections.

These and other objects of my invention will become more fully known as the description thereof proceeds, and will then be specifically pointed out in the appended claim.

In the accompanying drawing, forming a material part of this disclosure:

Figure 1 is a side view of a front wheel of a car equipped with the novel anti-skidding device constructed according to my invention.

Figure 2 is a cross section through the device on line 2—2 of Figure 3.

Figure 3 is an enlarged side elevation of one of the sections of my device.

Figure 4 is a cross section on line 4—4 of Figure 3.

Figure 5 is a view similar to Figure 3 of a modified form of my device, particularly intended for use with rear wheels, and Figure 6 is a cross section on line 6—6 of Figure 5.

The front wheel 10 of a car has its tire encased in a device composed of a plurality of sections, each comprising an upper, outer mantle 11 equipped with longitudinally extending strips or anti-skidding ribs 12 made integrally with the mantle 11.

To the lower edges of the mantle, flaps 13 and 14 are hingedly secured by means of leather straps 15 formed integrally with the upper edges of flaps 13, 14 and having their ends secured to said flaps by means of rivets 16 or the like. The sections 11 and flaps 13 may be constructed of metal, leather, or similar material. The meeting edges of the final two adjoining sections have angular flaps 17 provided with holes 18 for the passage of fastening nut bolts 19 in the manner best indicated in Figure 1, while the sections on their opposite ends carry tongues 20 adapted to enter slots 21 in the adjoining section, while rivets 22 secure the parts together.

At the joint or meeting edge of two sections, the material on one is reduced as at 23 for the reception of the correspondingly recessed part 23' of the adjoining section.

In order to securely hold the anti-slipping device on a wheel and tire, cables 24 are provided adapted to connect flaps 13 and 14 under the felly of the wheel at the spokes 25 as shown in Figure 1.

In Figures 5 and 6 a modified form of my device is illustrated suitable particularly for use on rear wheels.

The mantle 26 of this device is provided on its outer face with a longitudinal rib 27, and a plurality of parallel transverse ribs 28. In other respects this device is the same as described above.

The operation of the device will be entirely clear from the above description, and requires no further explanation.

Changes may be made in the general arrangement and in the construction of the minor details without deviating from the scope and spirit of my invention as defined in the appended claim.

Having thus described my invention what I claim as new, and desire to protect by Letters Patent is:

An anti-skidding device, comprising a sectional mantle with the sections interfitting and adapted to embrace the tread portion and a part of the side walls of the tire, depending flaps hingedly connected to each of said sections, the respective ends of each flap being formed with a tongue extension and a slot, the tongue extension of one flap being adapted to be passed through the slot of the adjacent flap, laterally extended flanges on the meeting edges of the terminal flaps of the device, said flanges being formed with bolt openings to permit fastening the device about the tire, and flexible connectors projecting from the free edges of opposing flaps and adapted to be interconnected inwardly of the wheel felly.

In testimony whereof I affix my signature.

STEVE GARRICK.